United States Patent [19]

Masunaga et al.

[11] Patent Number: 5,103,438
[45] Date of Patent: Apr. 7, 1992

[54] OPTICAL PICKUP DEVICE HAVING YOKE WITH A CENTRAL U-SHAPED BASE AND INVERTED U-SHAPED PORTIONS CONNECTED THERETO

[75] Inventors: Yoshifumi Masunaga; Yasuyuki Tashiro; Noboru Namigawara, Tokorozawa, all of Japan

[73] Assignee: Pioneer Electronic Corporation, Tokyo, Japan

[21] Appl. No.: 321,925

[22] Filed: Mar. 13, 1989

[30] Foreign Application Priority Data

Sep. 1, 1988 [JP] Japan .................................. 63-216219

[51] Int. Cl.$^5$ ............................................... G02B 7/00
[52] U.S. Cl. ........................... 364/44.22; 359/811; 359/823
[58] Field of Search ................... 350/255, 247, 245; 360/114, 99.01–99.12; 369/270, 271, 264, 44.16–44.21, 44.32

[56] References Cited

U.S. PATENT DOCUMENTS 4,587,647  5/1986  Mak et al. ........................... 369/270
4,669,823  6/1987  Iguma et al. ........................ 350/247

Primary Examiner—Roy N. Envall, Jr.
Assistant Examiner—Thang V. Tran
Attorney, Agent, or Firm—Sughrue, Mion, Zinn, Macpeak & Seas

[57] ABSTRACT

An optical pickup device for applying controlled light to a track of an optical disc. Light orientation is controlled by changing the angular orientation of an objective lens mounted on a holder. The holder is disposed above an actuator base and is supported in a cantilevered manner by a suspension member fixed to the actuator base. The actuator base is mounted on a pickup body movable in a tracking direction of the disc. The holder is integrally coupled with a central portion of a yoke member, so that the yoke is also movable. The yoke member has inverted U-shaped portions provided symmetrically with respect to the central portion. Further, a pair of magnets are provided each being fixed to the outer surface of the central portion, i.e., a first inner surface of the inverted U-shaped portion, and a pair of coil members are fixed to the base. Each of the coil members is positioned within each of magnetic gaps defined by each free end of the inverted U-shaped portion and each of the magnets.

7 Claims, 5 Drawing Sheets

OPTICAL PICKUP DEVICE HAVING YOKE WITH A CENTRAL U-SHAPED BASE AND INVERTED U-SHAPED PORTIONS CONNECTED THERETO

BACKGROUND OF THE INVENTION

The present invention relates to an optical pickup device for reproduction of information recorded on an optical recording medium such as a video disc and a compact disc.

A moving magnet type (MM type) optical pickup is well known. The MM type includes a holder, an objective lens, a magnet and a coil. The magnet is fixedly attached to the movable holder which mounts thereon the objective lens, and the coil is fixedly and stationarily disposed in confronting relation with respect to the magnet. The magnet is moved by a force induced by a current flowing through the coil, so moving the holder, so that angular orientation or posture of the objective lens is variable.

One example of a conventional MM-type optical pickup will be described with reference to FIGS. 1 and 2. Two suspension wires 2 extend in parallel with each other in the horizontal direction. One end of each of the suspension wires 2 is connected to an upstanding wall portion of an actuator base 1. Further, a holder 4 is positioned above the actuator base 1 for supporting an objective lens 3, and the holder is connected to each other end of the suspension wires 2. Therefore, the holder 4 is movably supported on the suspension wires 2 in a cantilevered fashion.

Magnets 5A and 5B are fixed to the holder 4. Further, focusing coils 7A 7B and tracking coils 8A 8B are mounted on Yokes 6A 6B which upstand from the actuator base 1. One of the magnets 5A confronts the focusing coil 7A and the tracking coil 8A, and the other magnet 5B confronts the focusing coil 7B and the tracking coil 8B. The combination of the holder 4, the coils 7,8, the magnets 5 and the suspension wires 2 is generally referred to as an actuator.

In operation, predetermined currents are passed through the focusing coil 7 and the tracking coil 8, respectively, to move the holder 4 in focusing direction X and tracking direction Y.

With such an actuator, the suspension wires 2 are formed of extremely flexible materials having low elastic modulus so as to ensure precise movement of the holder 4 in response to the magnetic forces. Stated differently, in the conventional actuator, a sufficiently high magnetic flux density has not been obtainable, and therefore, the suspension wires 2 have had to have extremely high flexibility so that the wires 2 do not restrain movement of the holder 4 in response to the generated magnetic attractive force. Further, the attractive forces act at all times between the magnets 5 and the yokes 6. Therefore, it is necessary to apply a force to the holder 4 in a direction to pull the suspension wires 2 so that the suspension wires 2 will not buckle upon movement of the holder 4. Stated otherwise, in FIG. 2, horizontal attraction force F' (which applies tensile force to the suspension wires 2) imposed on the holder 4 must be greater than another attraction force F directed in the opposite direction to the force F' (the force F applies an unwanted buckling force to the wires 2).

To meet such a requirement, it is proposed to select gap dimensions d, d' between the magnets 5 and the focusing and tracking coils 7,8. That is, the gap distance d' positioned remove from the ends of the wires 2 and defined between the magnet 5A and the coils 7A 8A is smaller than a gap distance d positioned close to the ends of the wires 2 and defined between the other magnet 5B and the other coils 7B 8B. As a result, the attractive force between the magnet 5A and the Yoke 6A and across the gap d' is greater than the attractive force between the magnet 5B and the Yoke 6B and across the gap d.

With such a structure, however, if the gap dimensions d, d' are different from each other, imbalance may occur with respect to operating forces f, f' (see FIG. 2) produced on opposite sides of the holder 4 in the direction of the optical axis of the objective lens 3. More specifically, a force P generated with the gap dimensions d, d' is expressed by:

$$P = \frac{1}{4\pi\mu} \cdot \frac{m_1 \cdot m_2}{d^2}$$

$\mu$: the magnetic permeability,
d: the gap dimension,
$m_1$, $m_2$ the magnetic field intensity.

Therefore, the difference between the gap dimensions d, d' affects, with its squared value, the operating forces f, f'. Due to the imbalance between the operating forces f, f', the actuator tends to roll when it operates, resulting in a reduction in reproduction efficiency or a servo control failure.

To avoid this drawback, one solution is to remove the yokes 6A 6B so that no attractive forces will be produced between the yokes 6 and the magnets 5. With this arrangement, however, the magnetic flux density generated when currents flow through the focusing and tracking coils 7,8 is reduced to less than 50 to 70% of the magnetic flux density that is available if the yokes 6 exist.

Consequently, a small-size, high-efficiency actuator cannot be realized if the yokes are dispensed with.

SUMMARY OF THE INVENTION

It is therefore, an object of the present invention to overcome the above-described drawbacks and disadvantages, and to provide an improved optical pickup device.

Another object of this invention is to provide such optical pickup device which can prevent suspension members from buckling.

Still another object of this invention is to provide the improved optical pickup device of compact size with high reproduction efficiency.

Still another object of the invention is to provide such device capable of avoiding servo control failure and giving high reproduction efficiency by obviating the rolling of the actuator.

These and other objects of the invention will be attained by providing an optical pickup device for reproducing information recorded on a recording medium, the pickup device having: a base; a suspension member fixed to the base; a holder disposed above the base and mounting thereon an objective lens, the holder being supported by the suspension member, the holder having opposite side portions; a magnet member provided to the side portion of the holder; a yoke member mounted on the holder together with the magnet member, a magnetic gap being provided in a closed magnetic path defined by the yoke member and the magnet member; and, a coil member fixed to the base and disposed in confronting relation to the yoke member. The coil member is positioned in the magnetic gap.

DETAILED DESCRIPTION OF THE PREFERRED EMBODIMENTS

A first embodiment according to the present invention will be described with reference to FIGS. 3 through 8.

Figure 3:
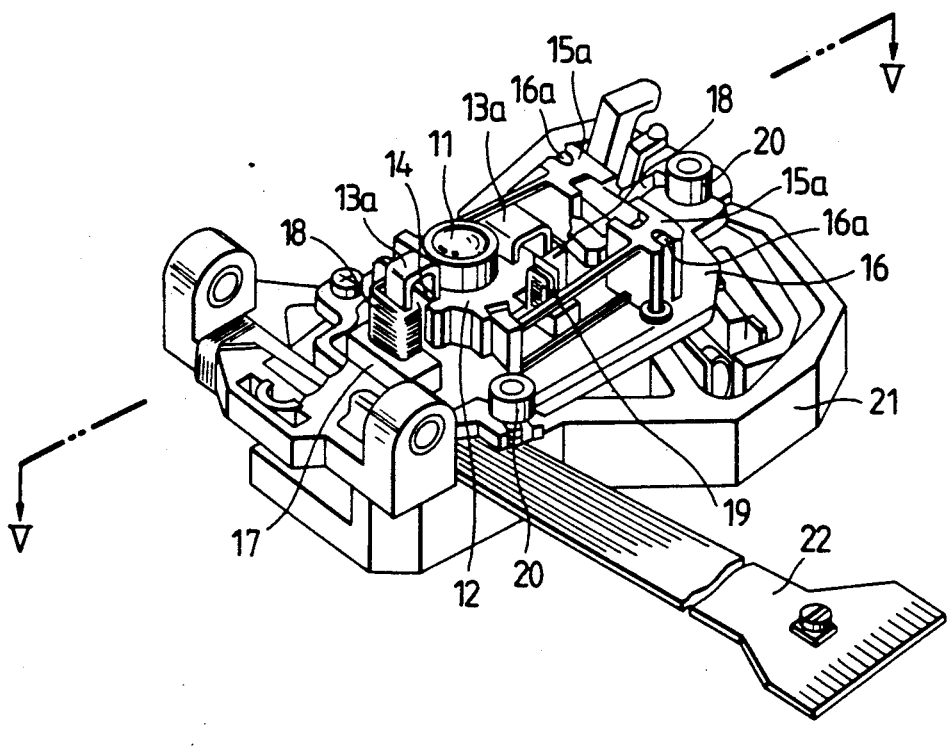
FIG. 3 is a perspective view showing an optical pickup device according to a first embodiment of the present invention.

As best shown in FIG. 3, an actuator base 16 is provided in the pickup device, and a suspension member 15 is fixedly mounted on the actuator base 16 for suspending a holder 12 which supports an objective lens 11. The actuator base 16 is mounted on a pickup body 21 interposing a flexible baseboard 22 therebetween.

Figure 4:
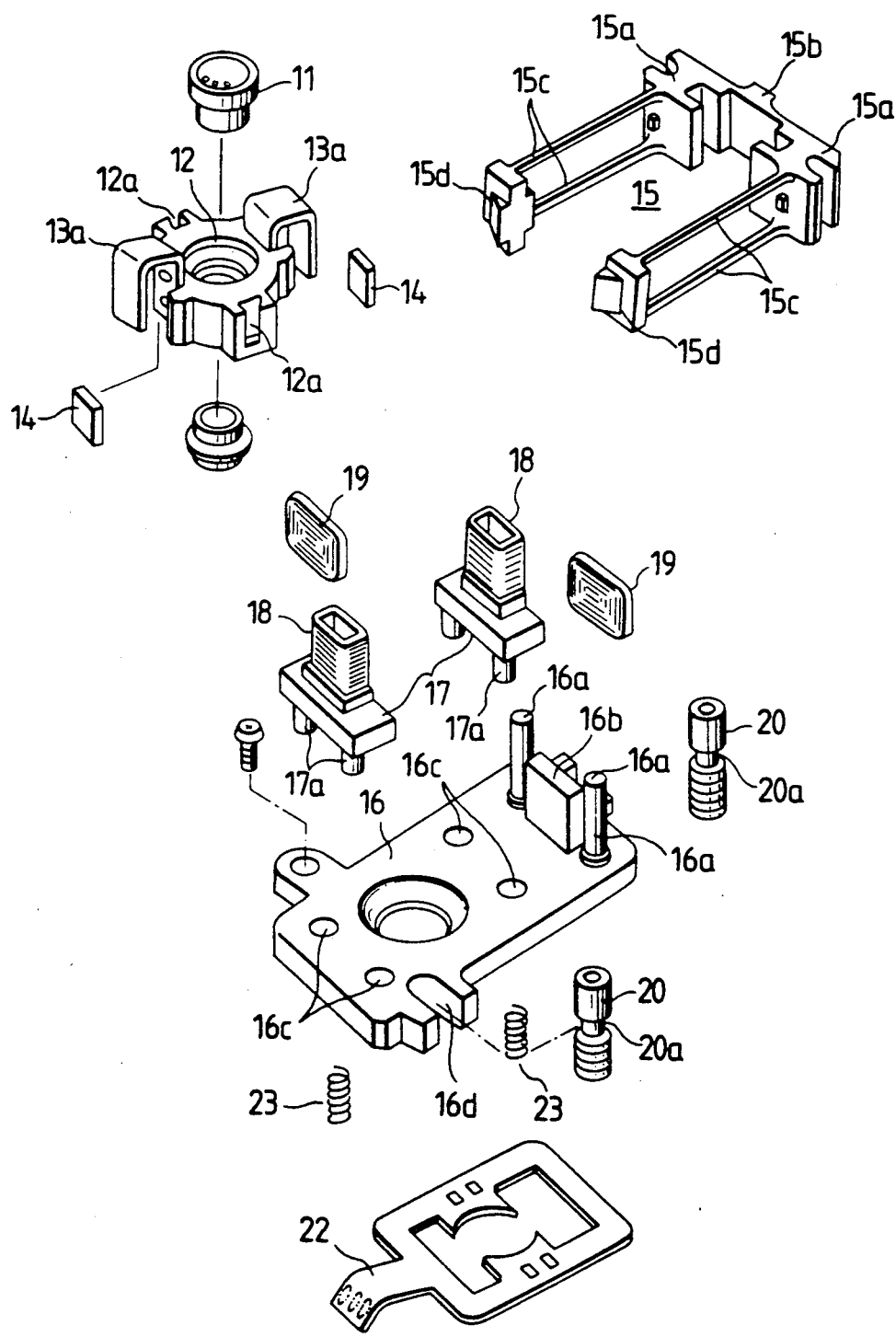
FIG. 4 is an exploded perspective view showing the optical pickup device.
Figure 6:
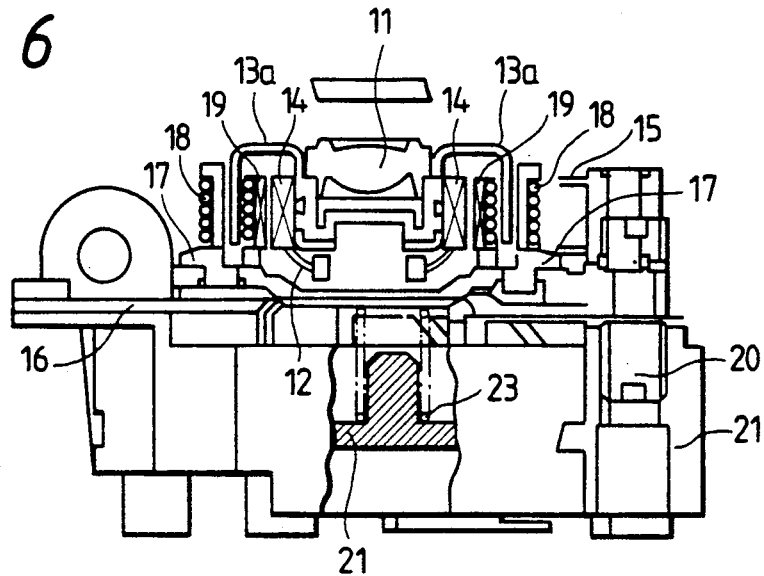
FIG. 6 is a side elevational view partially cross-sectioned showing the optical pickup device.

As shown in FIG. 4, the objective lens 11 is mounted on the holder 12 formed with dovetail grooves 12a defined in a first pair of opposite side portions. Further, a Yoke member 13 is coupled with the holder 12 at its second pair of opposite side portions extending perpendicular to the first pair of side portions.

The yoke member 13 (see also FIG. 8) has a base U-shaped portion 13A and inverted U-shaped wing portions 13a provided symmetrically on opposite ends with respect to the base portion 13A fitted with the holder 12. More specifically, the base or central U-shaped portion 13A is fitted with the second pair of opposite side portions of the holder 12. Further, each of the inverted U-shaped portions has a first inner surface close to the U-shaped portion and a second inner surface remote therefrom. Each of the free end portions of the inverted U-shaped portions functions as a yoke, and the second inner surface is defined at the inner surface of the free end.

By the coupling of the yoke member to the holder 12, the yoke member 13 also doubles as a counterweight for the holder 12. The base portion 13A of the yoke member 13 is formed with a central through hole 13b whose diameter is properly provided for serving as an iris through which light passes.

By coupling the single yoke member 13 with the holder 12, two wing portions 13a respectively function as yokes, and the integral yoke member 13 can increase the mechanical strength of the holder 12.

A magnet member including a pair of magnetic elements 14 and 14 is provided. Each of the magnets 14 is positioned within each of internal spaces of the inverted U-shaped wing portions 13a, and is fixed to inner surfaces of the respective wing portions 13a (i.e., at the above mentioned first inner surface), while providing magnetic gaps between the magnets 14 and outer legs o the free ends of the wing portions 13a.

Figure 7A:
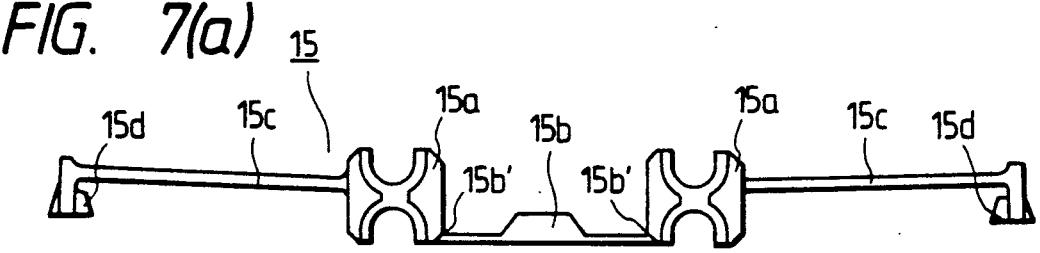
FIG. 7(a) and 7(b) are fragmental plan and side elevational views showing a suspension member.
Figure 7B:
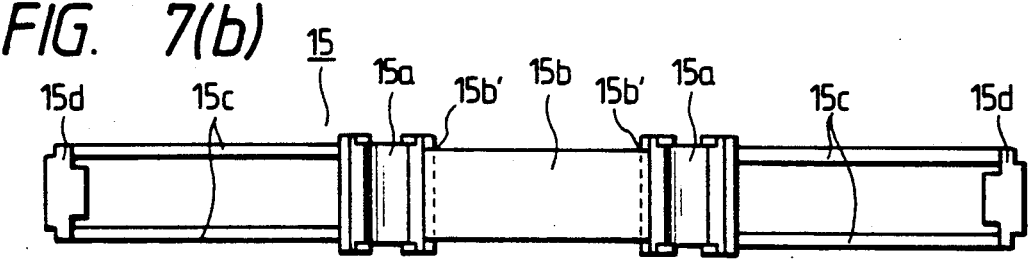
Figure 8:
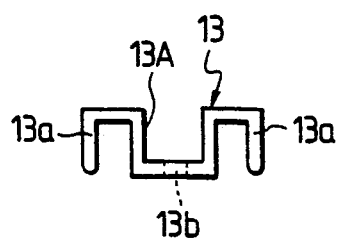
FIG. 8 is a cross-sectional view of a yoke member.

The suspension member 15 is coupled with the dovetail grooves 12a of the holder 12 as shown in FIG. 4 for suspendingly supporting the same. The suspension member 15 is produced by molding with a plastic material such as a polyester elastomer. As shown in FIGS. 7(a) and 7(b), the suspension member 15 has two central bases 15a interconnected by a thin wall 15b, two pairs of slender suspension arms 15c extending outwardly from the bases 15a, and two dovetail-shaped inserts 15d provided on the outer ends of the pairs of suspension arms 15c. From the state shown in FIG. 7(a), the thin wall 15b is bent at 90 degrees at each boundaries 15b' with respect to the base 15a, to bring the suspension arms 15c parallel to each other (see FIG. 4, and the inserts 15d are insertable respectively into the dovetail grooves 12a of the holder 12. Accordingly, the suspension arms 15c are connected to the first pair of opposite side portions of the holder 12.

The actuator base 16 is provided with two upstanding support columns 16a and a single prismatic column 16b positioned between the columns 16a. The suspension member 15 is mounted on the actuator base 12 by inserting each of the central bases 15a between the support column 16a and the prismatic column 16b as shown in FIG. 3. The suspension arms 15c thus support the holder 12 movably in cantilevered relation to the actuator base 16. Further, holes 16c and notched slots 16d are formed in the actuator base 16.

Figure 5:
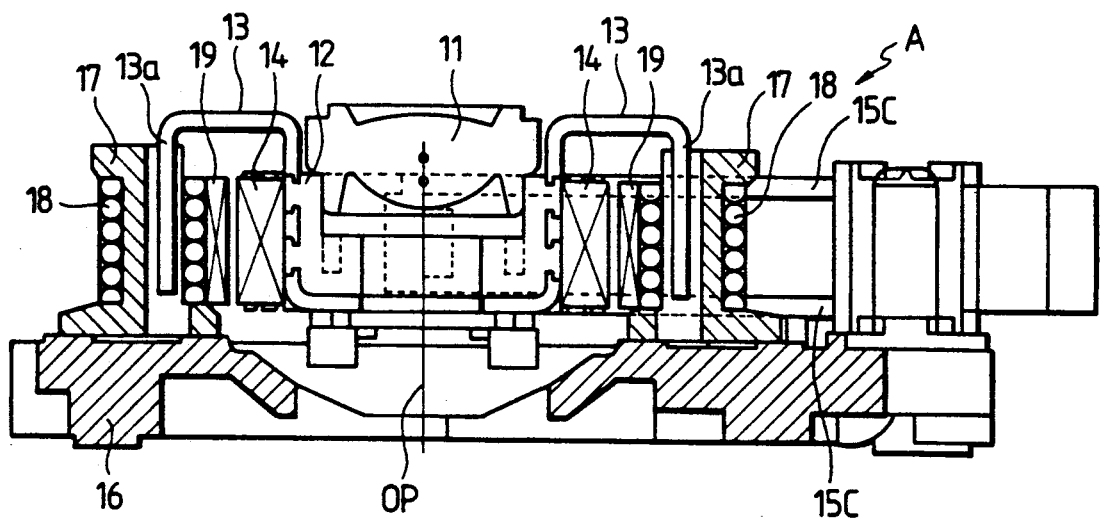
FIG. 5 is a cross-sectional view taken along the line V—V of FIG. 3 for particularly showing an actuator portion of the optical pickup device.

FIG. 5 shows an actuator A mounted on the pickup body 21 (FIG. 3). The actuator A includes the holder 12, the suspension member 15, the actuator base 16, a coil member which comprises a pair of coil elements each including a focusing coil 18 and a tracking coil 19, and the magnetic elements 14. The focusing coils 18 are wound respectively around two bobbins 17 made of a nonmagnetic material. The bobbins 17 each define hollow spaces therein. Further, the focusing coils 19 are fixed to inner surfaces of the focusing coils 18. Each of the bobbins 17 has a lower surface integrally provided with pins 17a which project downwardly. These pins 17a are inserted respectively in the holes 16c of the actuator base 16. Further, the outer legs of the wing portions 13a are insertable into the hollow space of the bobbins 17. Therefore, the focusing coils 18 and the tracking coils 19 are thus attached to the actuator base 16, while as shown in FIG. 5 the coils 18 and 19 are positioned in the magnetic gaps defined between the magnetic member 14 and the outer legs (i.e., the yoke) of the inverted U-shaped wing portions 13a of the yoke member 13. Since the holder 12 has the increased mechanical strength because of the coupling with the yoke member 13 and is supported by the suspension member 15, the holder 12 can provide a high vibration characteristic with respect to the actuator base 16. Incidentally, OP designates an optical axis passing through the objective lens 11 and the iris 13b. As a result, the first magnetic circuit is provided by one of the wing portions 13a and the associated confronting magnetic element 14, and a second magnetic circuit is provided by the remaining wing portion 13a and the associated confronting magnetic element 14.

The thus assembled actuator A is attached to the pickup body 21. Turning back to FIG. 4, each of skew knobs 20 formed with an annular groove 20a is inserted in each of the notched slots 16d of the actuator base 16 with the grooves 20a positioned respectively in the slots 16d. Further, coil springs 23 are interposed between the actuator base 16 and the pickup body 21. By the threading engagement of the skew knobs 20 with the pickup body 21, the actuator base 16 and the flexible baseboard 22 positioned therebelow are mounted on the pickup body 21. The focusing coils 18 and the tracking coils 19 are connected to the flexible baseboard 22 for electric connection to an external source outside of the optical pickup device.

The actuator base 16 can be angularly adjusted with respect to the pickup body 21 by rotating the skew knobs 20 and utilizing the resiliency of the coil springs 23 interposed between the actuator base 16 and the pickup body 21.

Figure 9:
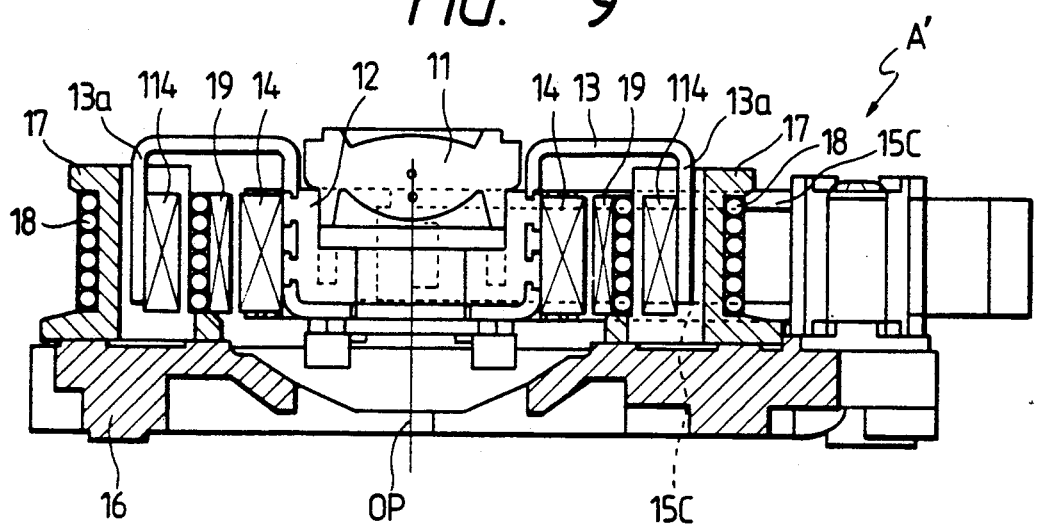
FIG. 9 is a cross-sectional view showing an actuator portion of an optical pickup device according to a second embodiment of this invention.

A second embodiment according to this invention will next be described with reference to FIG. 9, wherein like parts and components are designated by the same reference numerals and characters as those shown in the first embodiment. FIG. 9 particularly shows another actuator A' of the pickup device. In the first embodiment, each of the outer legs (i.e., free end portions of the yoke member 13) of the wing potions 13a is positioned so as to permit the coils 18 and 19 to be positioned within the magnetic gap defined by the leg and the confronting internal magnetic element 14. According to the second embodiment, in addition to this arrangement, further magnetic pieces 114 (second pair of magnetic elements 114 referred in claim 5) are attached to the inside surfaces of the outer legs (i.e., at the second inner surface), such that the supplemental magnetic piece 114 and the coils 18 and 19 are all positioned within the magnetic gap. With this arrangement, density of the magnetic flux applying to the coils 18 and 19 can be further increased, to thereby enhance the driving force on the actuator A', even though total mass of the actuator A' will be increased. Remaining structure is the same as the actuator A of the first embodiment, and therefore, further description is neglected to avoid duplication.

Figure 10:
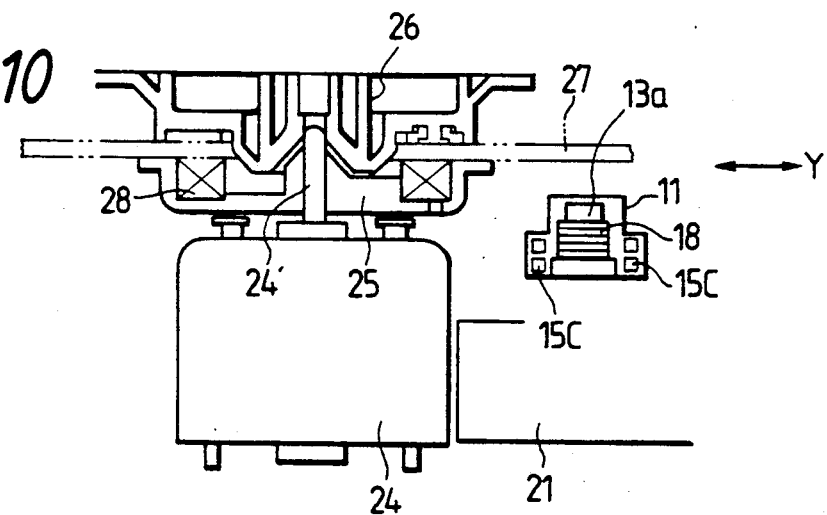
FIG. 10 a side schematic view showing a positional relationship between a turntable and the optical pickup device; and, FIG. 11 is a plan view showing the orientation of a yoke with respect to the turntable.

Next, a positional relationship between the optical pickup device according to this invention and neighbouring components will be described with reference to Figs. 10 and 11. The neighbouring components may be a turntable 25 and a drive motor 24 of a compact disc player. As shown, the turntable 25 is provided coaxial with a spindle 24' of the drive motor 24, and is provided rotatable by the actuation of the motor 24. Further, a clamper 26 is positioned above the turntable 25 and is movable in axial direction of the spindle 24'. The turntable 25 includes a disc mount body and an annular magnet 28 embedded therein for attracting the clamper 26 in order to fixedly interpose a recording medium such as a compact disc 27 between the clamper 26 and the turntable 25 and to rotate the disc 27 upon rotation of the drive motor 24. The annular magnet 28 is provided coaxial with the spindle 24' or the turntable 25.

Figure 11:
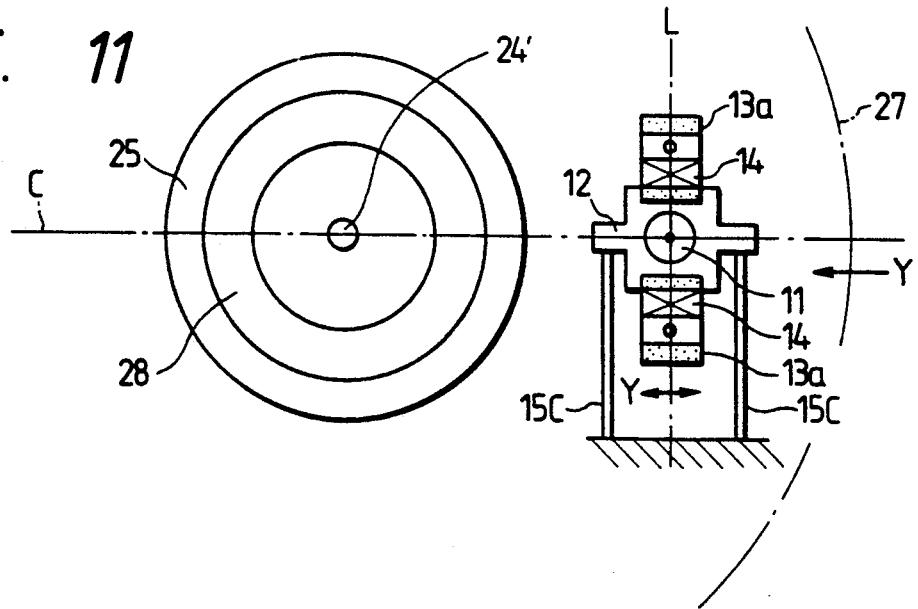

As shown in FIG. 11, the yoke member 13 is positioned to extend perpendicularly to the diametrical center line C of the turntable 25. More specifically, a line L connecting the wing portions 13a and 13a extends perpendicular to the center line C, and the both wing portions 13a and 13a are provided symmetrical with each other with respect to the center line C. Accordingly, the magnetic circuits provided at the wing portions are arranged symmetrically with respect to the optical axis OP of the objective lens 11. This symmetric arrangement of the magnetic circuits permits the driving center of the holder 12 to be coincident with the center of gravity thereof, to thus obviate unwanted rolling of the holder 12 or the actuator A or A'.

Further, magnetic force from the annular magent 28 in the turntable 25 or other magnetic force from the clamper 26 if the clamper 26 comprises a magnetic member should be taken into consideration in an aspect of the drivability of the actuator, since the actuator includes yokes, magnetic members and coils. If such a magnetic force from the annular magnet 28 on one of wing portions 13a which functions as the yoke is different from that on the other wing portion 13a which functions as the other yoke, the yoke member 13 may be tilted due to the integral structure of the wing portions 13a by way of the base body 13A, to thereby degrade operation or drivability of the actuator A or A'. In this invention, according to the present invention, such magnetic force from the annular magnet 28 on the one of the yokes is equal to or symmetrical with the magnetic force on the other yoke because of the symmetrical arrangement of the yoke member 13 with respect to the center line C as described above. As a result, disadvantageous tilting of the yoke member 13 is avoidable in the present invention. Incidentally, the yoke member 13 may be disposed to extend parallel to the central line C of the turntable 25 if the magnetic forces from the magnet 28 is negligible with respect to the yokes 13a.

In the optical pickup device thus constructed, the magnetic gaps are defined between each of the magnetic elements 14 and each of the inverted U-shaped wing portions 13a of the yoke member 13, and each of the focusing and tracking coils 18, 19 are always positioned in the magnetic gaps. Therefore, even when the wing portions 13a and the magnetic members 14 are moved by the focusing and tracking coils 18, 19, the effective magnetic flux from the yokes 13a and the magnets 14 is prevented from being displaced from the focusing and tracking coils 18, 19 and hence no sensitivity reduction occurs.

The DC sensitivity A and AC sensitivity $\alpha$ of the optical pickup device are expressed as follows:

$A = F/K = BlI/K$ $\alpha = F/m = BlI/m$

B: magnetic flux density, l: the effective length of the coil,

I: the current flowing through the coil,

K: the spring constant, m: the weight of the moving mass.

Inasmuch as the magnetic flux from the magnets 14 and the wing or yoke portions 13a is increased, the AC and DC sensitivities of the optical pickup device are increased, and in the present invention, high efficiency and high performance are obtainable even with a compact optical pickup device.

In view of the foregoing, according to the present invention, since the yoke and the magnets are integrally joined to each other, attractive forces produced therebetween would not adversely affect the objective lens holder and the suspension member. Therefore, the suspension member is prevented from buckling, and the holder is prevented from rolling.

Figure 1:
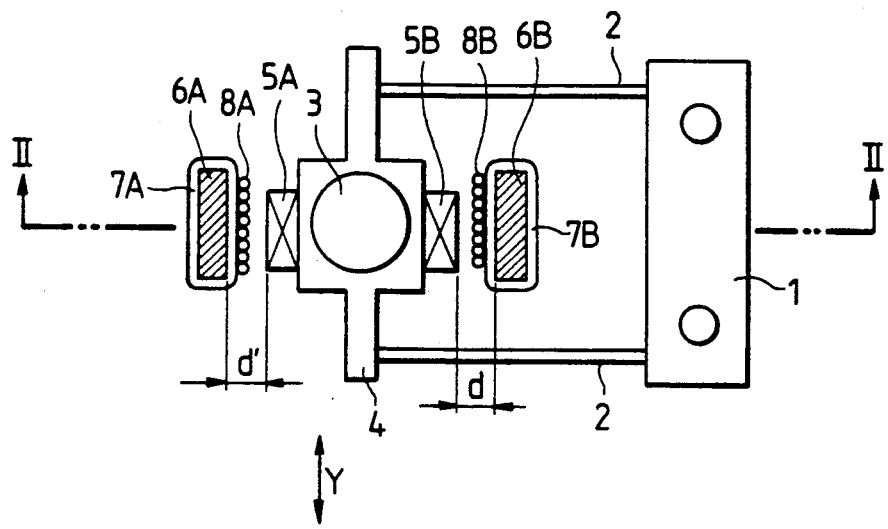
FIG. 1 is a plan view showing a conventional optical pickup device.
Figure 2:
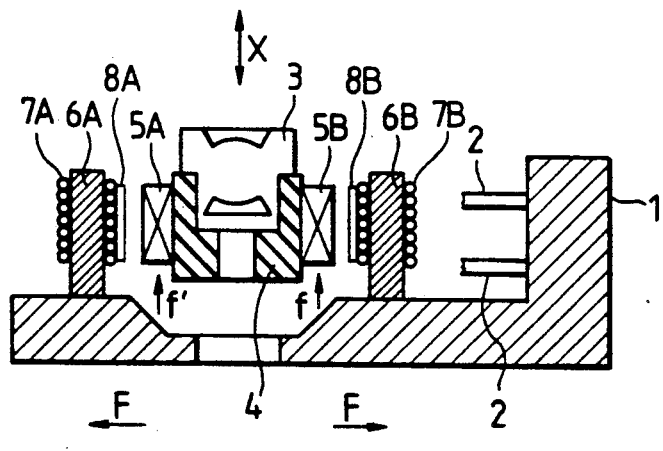
FIG. 2 is a cross-sectional view taken along the line II—II of FIG. 1.

Further, in the present invention, since sufficient flux density is obtainable, the suspension arms can have a rigidity much higher than that of the conventional suspension wires. That is, the thus produced magnetically attractive force can provide bending to the relatively rigid suspension arms and overcome the resiliencies thereof. Therefore, the suspension arms can suspend the holder without any aid of the gap difference (see d and d' in FIG. 1), and accordingly, symmetry in the gap results, to thus avoid disadvantageous rolling of the holder.

Moreover, since the yoke member is provided to the holder and the portion of the coil is positioned between the yoke and the magnet, magnetic gap distance can be maintained unchanged. Therefore, disadvantageous rolling is further avoidable in the present invention.

Furthermore, the yoke prevents the magnetic flux density of the magnets from being lowered, thus providing a highly efficient magnetic circuit, and stabilized operation of the actuator of the optical pickup device is attainable without rolling, hence the optical pickup device has a high reproducibility with high efficiency yet is small in size.

While the invention has been described in detail with reference to specific embodiments thereof, it would be apparent for those skilled in the art that various changes and modifications can be made therein without departing from the spirit and scope of the invention.

What is claimed is:

1. An optical pickup device for reproducing information recorded on a recording medium assembled in an information reproduction apparatus, said apparatus including a drive motor and a turntable connected to said drive motor, said optical pickup device comprising:
   a base;
   a suspension member fixed to said base;
   a holder disposed above said base and mounting thereon an objective lens, said holder being supported by said suspension member and having opposite side portions;
   a magnet member provided to said side portion of said holder;
   a yoke member mounted on said holder together with said magnet member, a magnetic gap being provided in a closed magnetic path defined by said yoke member and said magnet member; and
   a coil member fixed to said base and disposed in confronting relation to said yoke member, said coil member being positioned in said magnetic gap;
   wherein said magnet member is moved by a force created by a current flowing through said coil member, moving said holder, so that a position of said objective lens is variable.

2. The optical pickup device as defined in claim 1, wherein said magnet member comprises a pair of magnetic elements each being fixed to each of said opposite side portions.

3. The optical pickup device as defined in claim 2, wherein said coil member comprises a pair of coil elements, and wherein said yoke member comprises a central U-shaped base portion, and a pair of inverted U-shaped portions connected symmetrically to said central U-shaped base portion, said central U-shaped base portion being coupled to said side portions of said holder, each of said inverted U-shaped portion having a first inner surface close to said U-shaped portion and a second inner surface remote from said U-shaped portion, and each of said magnetic elements being fixed to each first inner surface portion, and each of said second inner surface portions confronting each of said coil elements.

4. The optical pickup device as defined in claim 3, wherein each of said coil elements comprises a focusing coil having one side confronting each of said magnetic elements, and a tracking coil fixed to said one side of said focusing coil.

5. The optical pickup device as defined in claim 3, further comprising a second pair of magnetic elements each fixed to each of said second inner surface portions.

6. The optical pickup device as defined in claim 3, wherein said turntable comprises a disc mount body and an annular magnet embedded in said disc mount body, said annular magnet being provided coaxial with said disc mount body, said disc mount body providing a first line passing through diametrically opposite sides thereof; and wherein said yoke member provides a second line connecting between said pair of inverted U-shaped portions, said second line extending in a direction perpendicular to said first line, and said inverted U-shaped portion being provided symmetrical with each other with respect to said first line.

7. An optical pickup device for reproducing information recorded on an optical disc defining an optical tracking direction, comprising;
   a pickup body movable in said tracking direction;
   an actuator base mounted on said pickup body;
   a pair of suspension members each having one end fixed to said actuator base and having another end;
   a holder movably positioned above said actuator base and supported to said actuator base by said suspension members, said holder having first pair of opposite side walls and a second pair of opposite side walls, said other ends of said suspension members being connected to said first pair of opposite side walls;
   an objective lens mounted on said holder;
   a yoke member coupled to said holder and comprising a central U-shaped base portion, and a pair of inverted U-shaped portions connected symmetrically to said central U-shaped base portion, each free ends of said inverted U-shaped portions functioning as yoke, said central U-shaped base portion being coupled to said second pair of opposite side walls, each of said inverted U-shaped portion having a first inner surface close to said U-shaped portion and a second inner surface remote from said U-shaped portion,
   a pair of magnetic elements each fixed to each of said first inner surface, each of said magnetic elements and each of said yoke defining a magnetic gap; and,
   a pair of coil elements extending upwardly from said actuator base, each of said coil elements being positioned in each of said magnetic gap.

* * * * *